(12) United States Patent
Tamai et al.

(10) Patent No.: US 6,945,905 B2
(45) Date of Patent: Sep. 20, 2005

(54) CVT HYBRID POWERTRAIN FUELING AND ENGINE STOP-START CONTROL METHOD

(75) Inventors: Goro Tamai, West Bloomfield, MI (US); Tony T. Hoang, Warren, MI (US)

(73) Assignee: General Motors Corporation, Detroit, MI (US)

( * ) Notice: Subject to any disclaimer, the term of this patent is extended or adjusted under 35 U.S.C. 154(b) by 18 days.

(21) Appl. No.: 10/691,065

(22) Filed: Oct. 22, 2003

(65) Prior Publication Data

US 2005/0090365 A1 Apr. 28, 2005

(51) Int. Cl.[7] .......................... B60K 1/02; B60K 41/12; B60K 41/04
(52) U.S. Cl. ............... 477/3; 477/43; 477/107
(58) Field of Search .................. 477/3, 43–4, 47, 477/107–8, 65.2–65.4

(56) References Cited

U.S. PATENT DOCUMENTS

| | | | | |
|---|---|---|---|---|
| 6,336,888 B1 | * | 1/2002 | Eguchi | 477/3 |
| 6,362,536 B1 | * | 3/2002 | Izumiura et al. | 180/65.2 |
| 6,428,444 B1 | * | 8/2002 | Tabata | 477/3 |
| 6,524,216 B2 | * | 2/2003 | Suzuki et al. | 477/3 |
| 6,595,895 B2 | * | 7/2003 | Suzuki et al. | 477/3 |
| 6,668,224 B2 | * | 12/2003 | Kawai et al. | 701/54 |
| 2001/0044358 A1 | * | 11/2001 | Taniguchi et al. | 477/44 |

* cited by examiner

Primary Examiner—Roger Pang
(74) Attorney, Agent, or Firm—Christopher DeVries (57) ABSTRACT

Methods are provided for controlling the fueling of a motor vehicle and specifically for controlling the cut off of fueling of a hybrid electric motor vehicle during deceleration of that motor vehicle. In a hybrid electric motor vehicle having an internal combustion engine, a motor/generator, and a continuously variable transmission, one embodiment of the method comprises the steps of sensing throttle position of the internal combustion engine and slewing the continuously variable transmission to a higher gear ratio in response to sensing a closed throttle position. The method further comprises the steps of cutting fueling of the internal combustion engine during the deceleration, and coupling the motor/generator in parallel with the internal combustion engine with the motor/generator operating as a generator.

11 Claims, 5 Drawing Sheets

CVT HYBRID POWERTRAIN FUELING AND ENGINE STOP-START CONTROL METHOD

FIELD OF THE INVENTION

The present invention generally relates to a method of fueling a motor vehicle, and more particularly relates to a method of deceleration and fuel cut-off for application in a parallel hybrid electric motor vehicle.

BACKGROUND OF THE INVENTION

Hybrid electric vehicles achieve high fuel mileage and low vehicle emissions by combining a battery-powered electric motor/generator (MG) with a highly efficient heat engine, typically an internal combustion engine (ICE). By using on-board engine computer controls to vary when the motor/generator or the heat engine, or both, are used, the hybrid motor vehicle can achieve peak efficiency in different driving conditions. A parallel hybrid electric vehicle (in contrast to a series hybrid) uses both the electric motor/generator and the heat engine to provide power to the driving wheels. Most parallel hybrid vehicles do not fix the ratio of power from the electric motor/generator and the heat engine, but rather vary the ratio of power from the electric motor/generator and heat engine depending on which engine or motor or combination thereof has the greatest efficiency in a particular situation. The motor vehicle MG functions as both a motor, delivering torque through some mechanism to the drive wheels, and as a generator, powering the motor vehicle's electrical system. When the MG is functioning as a generator, it may either be powered by torque from the motor vehicle ICE or the wheels of the motor vehicle. The MG also works a starter motor, spinning up the ICE to an engine rotation speed at which combustion is possible and efficient.

The efficiency of a hybrid electric vehicle can be improved further by using a continuously variable transmission (CVT). A continuously variable transmission operates in a similar manner to an 'automatic' transmission in that it does not require any clutch or shifter modulation by the driver of the vehicle, as is the case with a 'manual' transmission. Unlike traditional 'automatic' or 'manual' transmissions, however, a CVT does not have fixed gear ratios. Between the maximum and minimum possible gear ratios, a CVT has an infinite number of possible gear ratios. One form of continuously variable transmission works by having a belt turn on two pulleys. One pulley is connected to the input sheave of the transmission, which receives power from the engine of the vehicle. The other pulley is connected to the output sheave of the transmission, which delivers power to the wheels of the vehicle. Each of the pulleys consists of two halves, each having a V-shaped inner surface, along which the belt connecting the two pulleys rides. By varying the distance between the two halves of one of the pulleys, the effective diameter of the pulley is changed owing to the V-shaped surface of the pulley. Thus, the ratio of the transmission can be changed steplessly by altering the spacing between the pulley halves. In addition to having an infinitely variable gear ratio, a CVT also has the advantage that the gear ratio can be changed more smoothly than is possible with either an automatic or a manual transmission.

In a hybrid electric vehicle, regardless of transmission type, it is desirable to be able to cut fuel to the heat engine during deceleration (to save fuel) but to be able to quickly restart the heat engine if and when the driver desires to cause the vehicle to accelerate. One conventional approach to engine restarting in hybrid vehicles is accomplished by using the MG to spin up the ICE to an engine speed at which combustion in the engine is possible and efficient. This approach potentially has problems, however; for example, the battery pack that powers the MG may not have enough charge to start the ICE. Another approach to restarting the ICE is to leave the engine running as the vehicle slows to a stop and use regenerative braking to charge up the MG battery pack. The MG functions as a generator as the vehicle is slowing, taking power from the ICE or the vehicle wheels and acting as a generator in order to charge the MG battery packs. As soon as the vehicle stops, the ICE turns off, and the MG battery packs have enough charge to restart the ICE. This approach also has problems, however. Leaving the engine running as the vehicle slows is not as fuel efficient as shutting off the engine during deceleration for the obvious reason that the ICE is on longer and thus burns more fuel.

Accordingly, it is desirable to provide a CVT hybrid powertrain fueling and engine stop-start control method that is both fuel efficient and smooth. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for controlling the fueling of a motor vehicle and specifically for controlling the cut off of fueling of a hybrid electric motor vehicle during deceleration of that motor vehicle. In a hybrid electric motor vehicle having an internal combustion engine, a motor/generator, and a continuously variable transmission, the method comprises the steps of sensing throttle position of the internal combustion engine and slewing the continuously variable transmission to a higher gear ratio in response to sensing a closed throttle position. The method further comprises the steps of cutting fueling of the internal combustion engine during the deceleration, slewing the CVT ratio as a function of state of charge (SOC) of the motor/generator battery pack, and coupling the motor/generator in parallel with the internal combustion engine with the motor/generator operating as a generator.

BRIEF DESCRIPTION OF THE DRAWINGS

The present invention will hereinafter be described in conjunction with the following drawing figures, wherein like numerals denote like elements, and in which FIG. 1 schematically illustrates an application of parallel hybrid electric vehicle drivetrain in accordance with one embodiment of the invention.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A continuously variable transmission (CVT) hybrid powertrain fueling and engine stop-start control method for use in a hybrid electric vehicle, in accordance with an embodiment of the invention, utilizes backdriveability of the internal combustion engine (ICE) by the vehicle drive wheels in order to maintain the ICE turning (whether or not the engine is fueling and firing) during deceleration. The ICE can thus be quickly restarted without assistance from the electric motor/generator while the vehicle is moving. A deceleration-fuel cut-off (DFCO) method, in accordance with a further embodiment of the invention, also utilizes features of the CVT architecture that allow for a smooth vehicle deceleration that is not plagued with engine rotation spikes that occur during shifts of a stepped automatic transmission.

The transmission gear ratio establishes the appropriate ratio between engine rotation and vehicle speed. This can be expressed as the ratio of N/V measured in rotation per minute of the engine crankshaft divided by vehicle speed in miles per hour. (rpm per mph). Backdriveability refers to a vehicle's ability to have the vehicle wheels turn the vehicle transmission, with the transmission then turning the vehicle's engine. This is the reverse of the normal operation in which a vehicle's engine powers (and turns) the transmission, and the transmission delivers the engine power to the vehicle wheels, causing the wheels to turn. Backdriveability occurs in manual transmission vehicles, for example, when the vehicle is pushed with the clutch engaged, the engine off, and the transmission in gear. When a motor vehicle ICE is on, backdriving is often referred to as 'engine braking.' If a transmission is downshifted to a gear such that N/V is too low for the vehicle speed, the wheels will be turning at a speed higher than appropriate for the speed of rotation of the ICE crankshaft, and the wheels will begin to backdrive the engine. The wheels are then forced to slow down to a speed closer to a speed that matches the rotational speed of the ICE crankshaft (i.e., increase N/V). It is advantageous to backdrive the ICE during deceleration in a parallel hybrid electric vehicle because it allows the ICE to quickly restart (if fuel has been cut to the heat engine) upon an acceleration demand. The ICE can simply begin receiving fuel and start firing, without input from the electric motor/generator (MG). In a parallel hybrid electric vehicle the MG is either attached to the ICE crankshaft between the ICE and the transmission (in the case of a flywheel-alternator-starter MG arrangement, or FAS) or the MG is attached to the ICE crankshaft by a belt attached at the front of the ICE (in the case of a belt-alternator-starter MG arrangement, or BAS). Because the MG is coupled to the crankshaft of the ICE, in addition to contributing to the restart capability of the ICE, backdriving the ICE also allows the MG to be powered by the vehicle wheels and thus allows regenerative braking as the vehicle slows with the ICE off.

Figure 1:
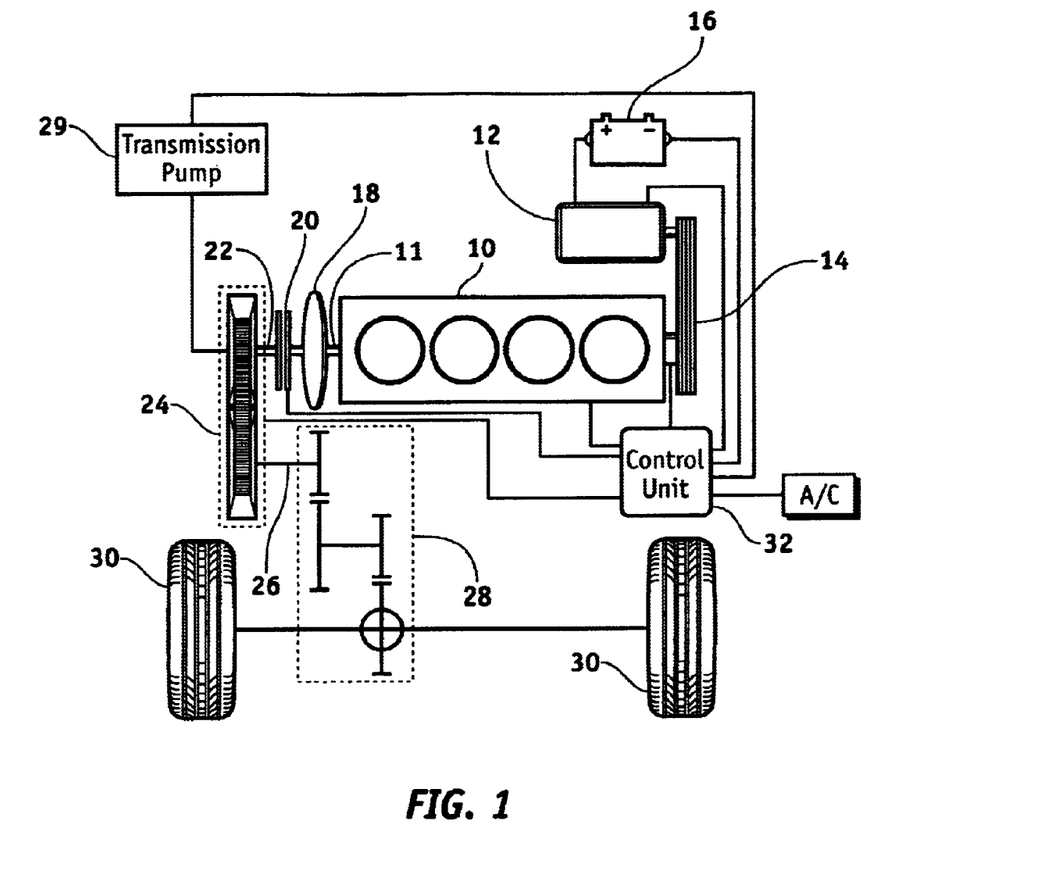

FIG. 1 schematically illustrates an application of parallel hybrid electric vehicle drivetrain in accordance with one embodiment of the invention. ICE 10 turns crankshaft 11, and electric motor/generator (MG) 12 is attached to crankshaft 11 in a BAS configuration through belt drive 14. In accordance with the illustrated embodiment, ICE 10 is a four cylinder engine, although the method is applicable to an ICE with a greater or lesser number of cylinders. In accordance with the illustrated embodiment, MG 12 is a belt-alternator-starter arrangement, although the DFCO method in accordance with the invention is equally applicable to a flywheel-alternator-starter MG or other arrangement. MG 12 draws power from a battery pack 16. The crankshaft delivers power (either from the ICE or from the MG) through torque converter 18, which then delivers power to input clutch 20.

When input clutch 20 is 'closed' or 'engaged', power from ICE 10 or MG 12 is coupled to continuously variable transmission (CVT) 24. When the input clutch is 'open' or 'disengaged', no power from ICE 10 or MG 12 is coupled to CVT 24. CVT 24 has an input shaft 22 that receives power from the ICE and the MG and an output shaft 26 that couples power from the transmission to a reduction gear and differential system 28. Reduction gear and differential system 28 delivers this power to wheels 30. An electric transmission pump 29 maintains the CVT line pressure when the engine is stopped. A control unit 32 monitors and/or controls several drivetrain functions, including but not limited to vehicle speed, CVT gear ratio, electric transmission pump and CVT line pressure, crankshaft speed, desired torque output (based on the ICE accelerator pedal position), battery pack state of charge (SOC), MG and battery pack temperature, and ICE fueling and firing. The control unit also monitors brake application via a switch and/or brake line pressure sensor and/or brake-pedal displacement sensor (none illustrated). The control unit monitors brake application in order to determine intent to slow the vehicle. The control unit sends communicatory signals that control a number of engine functions including the CVT gear ratio, the opening and closing of the input clutch, the opening and closing of the torque converter clutch, and the electric transmission pump. Communicatory signals from the control unit also control whether the motor/generator functions as a motor or as a generator and adjusts the power input or output of the MG. The control unit also sends communicatory signals that control throttle position of the ICE and that adjust fueling and firing. The control unit may be, for example, a stand-alone computer chip, a portion of the engine management system, or the like. The control unit can be programmed in the normal manner by those of skill in the art to carry out the recited functions.

In one preferred embodiment of the invention, the traditional torque converter is replaced with a reverse free-wheeler torque converter. The freewheeler torque converter is more durable and allows quicker transitions between backdriving and regular driving. This is advantageous in stop-and-go driving situations, where the driver is constantly switching between accelerating (when backdriving is not used) and decelerating (when backdriving is used). A reverse freewheel torque converter and its method of operation are described in U.S. Pat. No. 6,254,507.

In accordance with a preferred embodiment of the invention, the control unit monitors and controls the functioning of the internal combustion engine, the motor/generator, and the gear ratio of the continuously variable transmission to optimize the fuel cut-off during a deceleration. In accordance with an embodiment of the invention, backdriveability of the ICE is controlled by the control unit, which modulates the torque converter clutch (TCC) to allow for backdriveability. If the clutch is engaged or in a limited slip state, backdriveability can occur.

Figure 2:
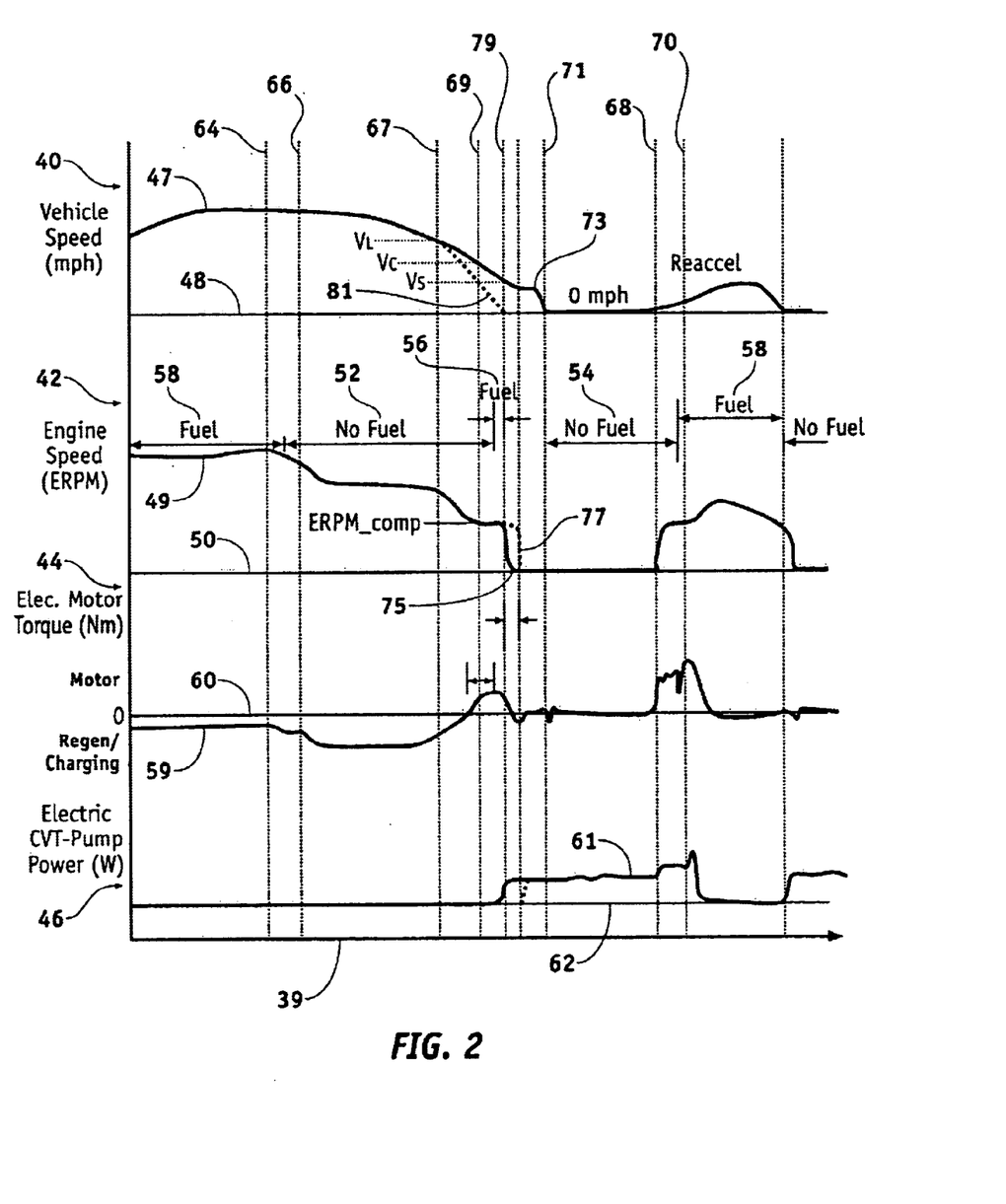
FIG. 2 illustrates in graphical form several engine functionalities of a parallel hybrid electric vehicle during a deceleration, in accordance with an embodiment of the invention.

FIG. 2 illustrates in graphical form several engine functionalities of a parallel hybrid electric vehicle during a deceleration, in accordance with an embodiment of the invention. The figure illustrates these functionalities during a representative deceleration to a stop and a subsequent reacceleration. Each of the functionalities is plotted as a function of time, with time plotted along horizontal axis 39. Portion 40 of the graph plots vehicle speed in miles per hour (mph) versus time. Portion 42 of the graph plots crankshaft rotation of ICE 10 in rotations per minute (RPM) versus time. Portion 44 of the graph plots the torque the MG produces or receives in Newton-meters (Nm) versus time.

Portion 46 of the graph plots CVT line pressure in kilopascals (kPa) versus time.

Line 47 in portion 40 indicates the speed of the vehicle in mph during a representative time period, with horizontal line 48 representing zero mph. Line 49 in portion 42 represents the corresponding ICE crankshaft rotation in RPM during the representative time period, and horizontal line 50 represents zero RPM. Periods 52 and 54 are time periods during which the ICE receives no fuel, and periods 56 and 58 are time periods during which the ICE does receive fuel. Line 59 in portion 44 represents MG torque in Nm and horizontal line 60 represents zero Nm. When line 59 is negative (below line 60), the MG is operating as a generator, and when the line is positive (above line 60), the MG is operating as a motor. Line 61 in portion 46 represents the CVT line pressure in kPa, and horizontal line 62 represents zero kPa.

The vertical lines in FIG. 2 represent times at which functions illustrative of the embodiment of the invention occur. Vertical line 64 represents the time at which the accelerator pedal is released and the ICE throttle closes. This can be, for example, the time at which the vehicle driver stops accelerating. Vertical line 66 represents the time at which the vehicle's brakes are applied causing the vehicle to start decelerating. Vertical line 67 represents the time at which a critical vehicle speed (to be explained more fully below) is reached. Vertical line 69 represents the time at which a critical ICE RPM (also to be explained more fully below) is reached. Vertical line 71 represents the time at which the vehicle speed reaches zero mph. Vertical line 68 represents the time at which the brakes are released, and vertical line 70 represents the time at which the accelerator is reapplied and the ICE throttle is opened, for example in response to the vehicle driver depressing the accelerator pedal to begin reacceleration.

Figure 3A:
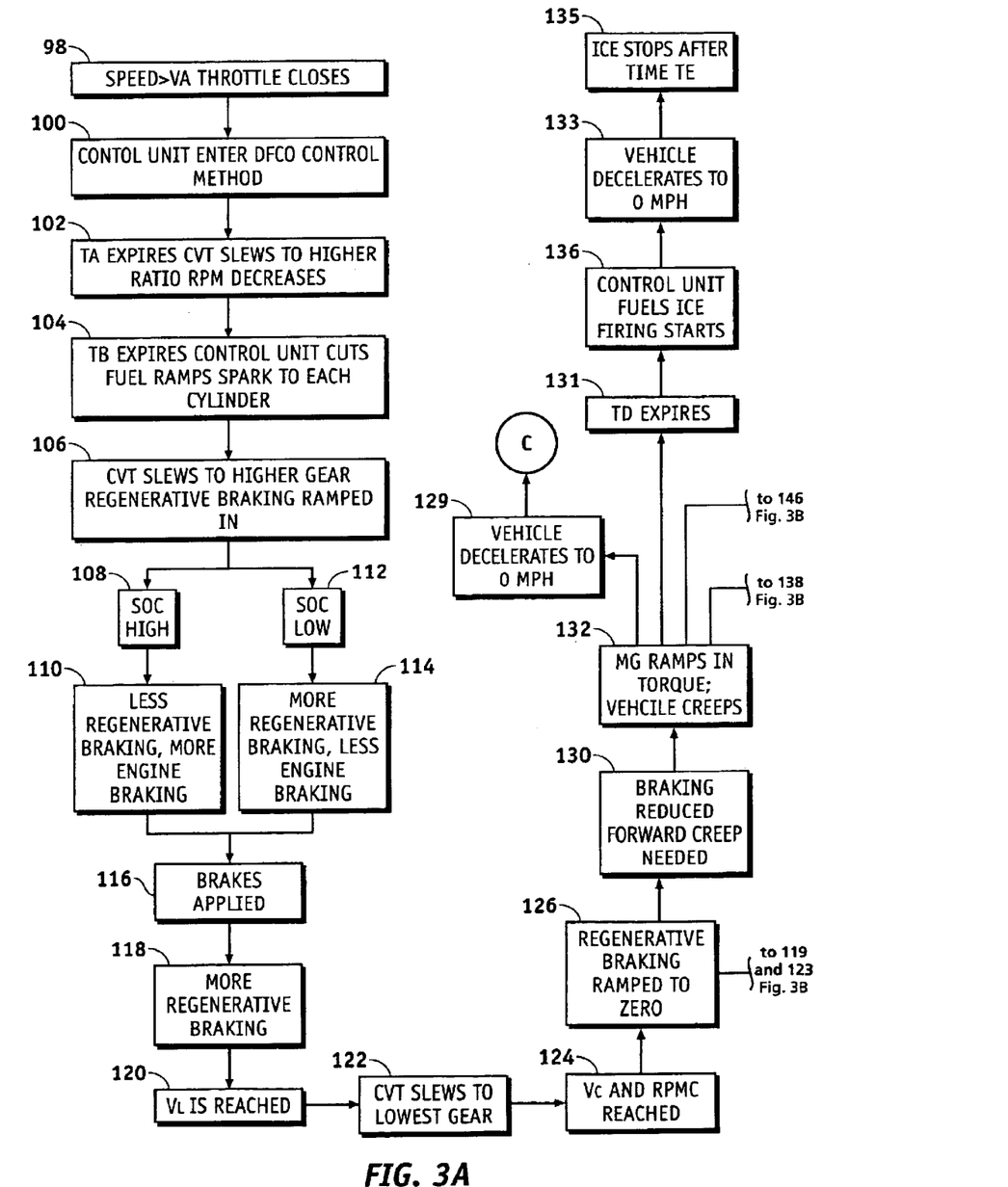
FIGS. 3A–C illustrates a process in accordance with an embodiment of the invention in a flow chart format.
Figure 3B:
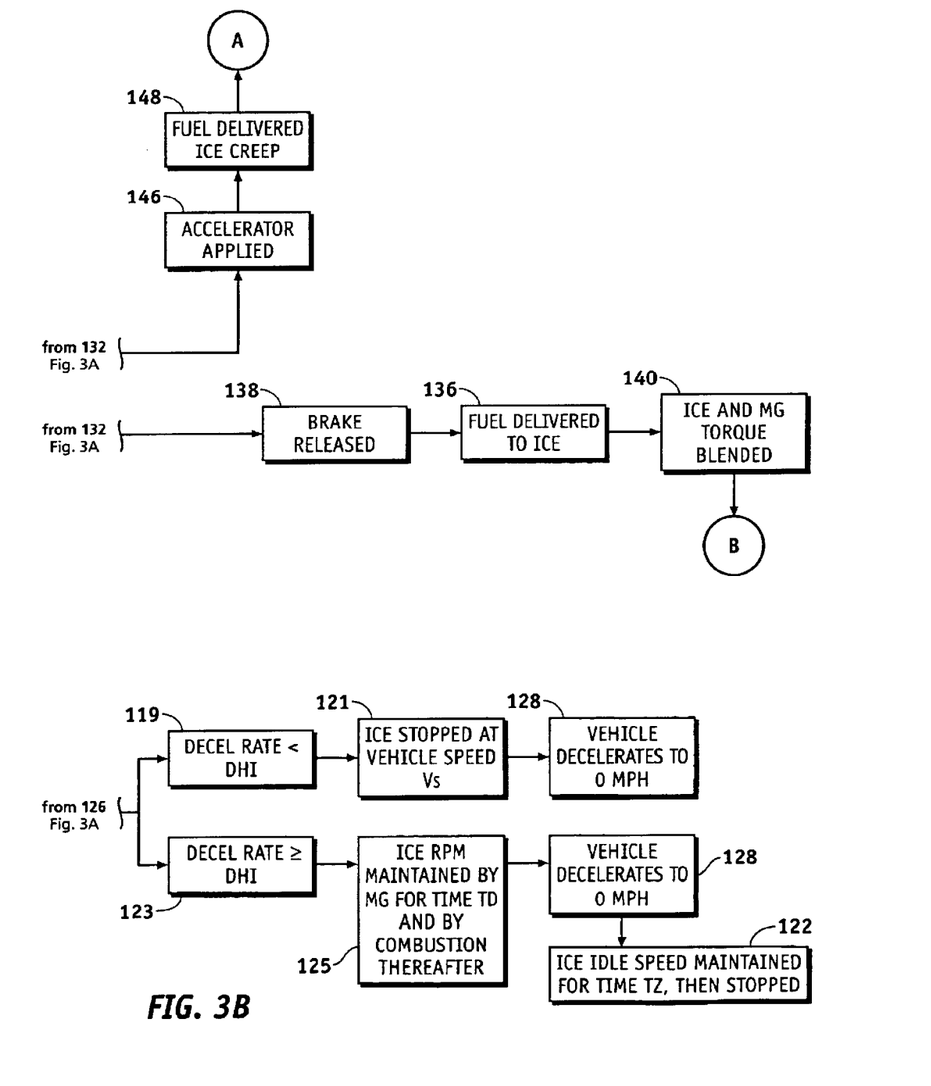
Figure 3C:
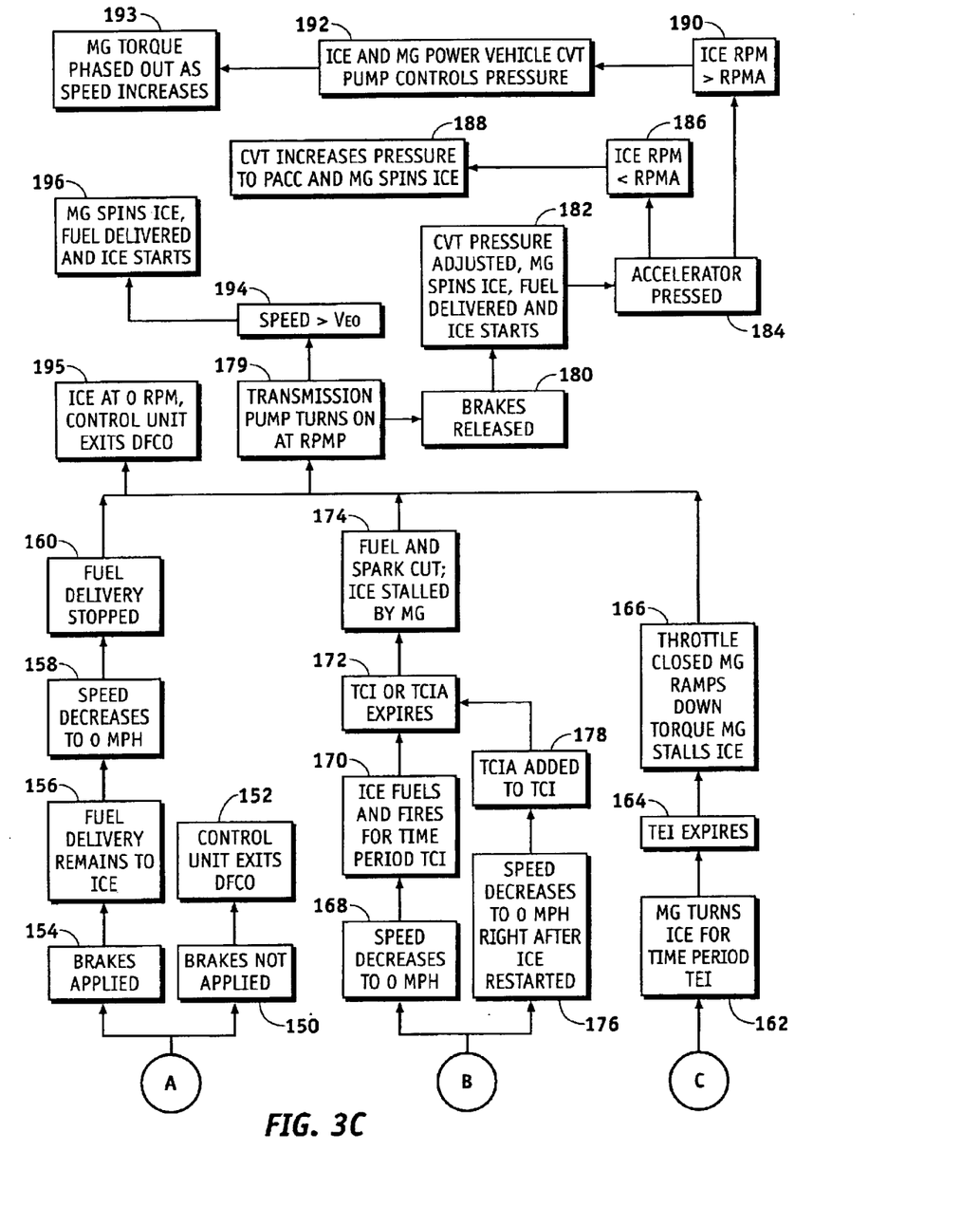

The flow charts in FIGS. 3A–C illustrates steps for a deceleration-fuel-cut-off (DFCO) method in accordance with an embodiment of the invention. The method can be understood by referring to FIGS. 3A–C and with continued reference to FIGS. 1 and 2. The control Unit on a parallel hybrid electric vehicle with a CVT begins using the DFCO control method (step 100) if the control unit senses that the ICE throttle is closed and the vehicle is moving at a speed greater than a predetermined speed, $V_A$ (for example, twenty-five mph) (step 98). This is illustrated on FIG. 2 by vertical line 64. $V_A$ is the vehicle speed at which fuel cut-off is triggered due to accelerator-pedal release. If the brake is applied, this critical vehicle speed $V_A$ is lowered to a value $V_{AB}$ (for example twelve mph). After some time period $T_A$ (for example, one second), if the throttle does not re-open (the accelerator pedal is not depressed), the control unit sends a communicatory signal causing the CVT to change gears to a higher gear (step 102). As line 49 illustrates in FIG. 2, closing the throttle and shifting to a higher gear causes a lowering of the ICE RPM. Shifting to the higher gear is done to reduce engine braking so the vehicle can coast to conserve fuel. After a time increment $T_B$ (for example, 0.2 seconds) after throttle closing, the control unit sends a further communicatory signal to cause the ICE to stop fueling, cylinder by cylinder, while ramping the spark to each cylinder after it has fired (step 104). The vehicle is now within time period 52 illustrated in portion 42 of FIG. 2. At this time, the control unit sends communicatory signals causing the CVT to again change gears to a higher gear, and causing the MG to function as a generator and to ramp in low-torque regenerative braking (step 106). When the MG functions as a generator, it increases the load on the drivetrain and thus increases drivetrain drag. Thus, having the MG function as a generator effectively slows the vehicle. By changing to a higher gear, the ICE RPM is lowered and engine braking is reduced further, but ramping in the regenerative braking maintains a consistent vehicle coasting feel. As line 47 illustrates in FIG. 2, the vehicle speed is held substantially constant after the throttle is released (but before the brakes are applied), but ICE RPM has decreased and more torque has been diverted to the MG to allow for regenerative braking. How much regenerative braking the MG does is dependent on the state of charge (SOC) of battery pack 16. In accordance with an embodiment of the invention, the control unit continuously monitors the battery pack SOC and determines the appropriate CVT gear ratio based, in part, on the SOC. If the control unit detects that the battery pack SOC is high, meaning that it is fully or nearly hilly charged (step 108), the control unit causes the CVT to change to a less-high gear than if the battery pack is not fully or nearly fully charged. If the SOC is high, the control unit also causes the MG to ramp in less regenerative braking (step 110). If the battery pack's SOC is low, meaning that the battery pack needs recharging (step 112), the control unit causes the CVT to change gears to a higher gear, thereby reducing engine braking, and causes the MG to ramp in more regenerative braking (step 114).

If the control unit detects the brakes of the vehicle being applied (as represented by vertical line 66 in FIG. 2) (step 116), the control unit sends communicatory signals causing the MG to ramp in even more regenerative braking to assist in slowing the vehicle (step 118). The control unit coordinates the state of the brakes, the CVT ratio, and the MG to make the braking feel as consistent as possible to the driver. As the MG battery pack charges, and thus less regenerative braking is required of the MG, the control unit slews the CVT ratio to a lower gear, or if electrically actuated brakes are implemented, the control unit causes the brake system to increase braking. In a further embodiment of the invention, if the motor vehicle is provided with a variable-capacity air-conditioning compressor, and it is activated, the compressor capacity is increased during a deceleration to decrease the temperature of the air conditioning evaporator. The compressor load is modeled so that the regenerative braking torque can be reduced to result in a consistent deceleration feel. Having increased the compressor capacity before engine shutoff increases the engine-off time at a vehicle stop before cabin conditions become uncomfortable with the air conditioning compressor not being operated by the engine. Likewise, the compressor capacity can be increased for the time before engine shutdown when the vehicle is stopped.

During the DFCO control mode, in accordance with an embodiment of the invention, after braking is initiated, the control unit maintains the ICE RPM at a constant level until the vehicle slows to a predetermined vehicle speed $V_L$ (for example, 15 mph) (step 120). This is evident in FIG. 2, where line 49 is substantially flat from the time indicated by line 66 until the time indicated by line 67. This corresponds to the time at which the vehicle reaches a speed $V_L$ as indicated by line 67 in portion 40. At this time, the control unit sends a signal causing the CVT to change gears to a lower gear, and preferably to the lowest gear possible (step 122). The lower gear allows the vehicle wheels to backdrive the ICE at the low vehicle speed. When the vehicle speed reaches a second predetermined speed, $V_C$ (for example a speed of ten mph) at which point the ICE is at $RPM_C$ (for example 700 rpm) represented by vertical line 69 in FIG. 2 (step 124); the MG regenerative braking is ramped to zero (step 126). Thus, the MG is no longer acting as a generator, but neither is it providing power and acting as a motor. At this time and at this vehicle speed and engine RPM, the ICE RPM is so low that compression pulsations may be noticeable. The MG regenerative braking torque is ramped to zero to because the combined braking from the engine braking and the mechanical braking is sufficient to slow the vehicle while maintaining a predictable deceleration feel. At this time, the driver's braking aggressiveness is quantified by the vehicle deceleration rate D. If the driver is braking lightly or moderately (deceleration rate is less than $D_{hi}$) (for example, −0.33 g's or about −3.3 m/s$^2$) (step 119), as the vehicle decelerates to zero mph under such non-abrupt deceleration (step 128), the ICE is stopped at vehicle speed $V_S$ (for example, three mph) (represented by vertical line 79 in FIG. 2) (step 121), resulting in ICE RPM dropping to zero (position 75 on line 49). If $V_S$ is reached before a time TD (for example, three seconds) expires, the entire deceleration can be performed without fuel.

If the driver is braking heavily (deceleration rate is greater than or equal to $D_{hi}$) (step 123), the vehicle speed line is as indicated by dotted line 81 in FIG. 2. During this abrupt deceleration, the ICE speed is maintained by the MG for time a $T_D$, and by combustion power thereafter (step 125). Once the vehicle speed reaches 0 mph under these deceleration conditions (step 128), the idle speed is maintained for time $T_Z$ (for example, 0.5 seconds) before the ICE is stopped (step 127) (dotted line 77 in FIG. 2).

If the brake pressure is reduced while vehicle speed is below $V_C$ but before $V_S$ is reached, the control unit interprets that forward "creep" (step 130) torque is needed. The control unit causes the MG to function as a motor and ramp in positive torque to the ICE crankshaft (step 132). The MG, acting as a motor, maintains the ICE motoring at a steady RPM as indicated by the flatness of line 49 between the times indicated by vertical lines 69 and 79. The vehicle continues this electric forward creep for a time period $T_D$ (for example 3 seconds) that is proportional to various parameters, including but not limited to battery pack SOC, battery temperature, and motor temperature. At this time in the method, several options are available, depending on operating conditions and subsequent events. After $T_D$ expires (step 131) or if the battery pack SOC drops too low, the ICE must be refueled (period 56) (step 136) in order to continue to creep the vehicle forward, and to power the MG so that the MG can recharge the battery pack. Once the vehicle is stopped (step 133), the engine is stopped after some time $T_Z$ (step 135).

In an additional embodiment of the invention (not illustrated), the ICE is never allowed to stop if the vehicle is moving. Regardless of the braking severity, or brake release time, the ICE is stopped only at time $T_Z$ after the vehicle has stopped.

If the vehicle is being electrically crept forward before $T_D$ expires and the brake is fully released (step 138), the control unit causes fuel to be delivered to the ICE and causes the ICE to begin firing (step 136). The control unit again modulates the amount of torque the MG produces and carefully blends the torque from the ICE and MG (step 140) in order to avoid disconcerting axle torque and RPM fluctuations.

If the accelerator pedal is depressed during the time period when only the MG is powering the forward creep (step 146), the control unit causes fuel to be delivered to the ICE and causes the ICE to begin firing. The ICE torque is slowly increased to ramp in ICE powered forward creep (step 148), while power from the MG (functioning as a motor) is ramped down until the MG is no longer acting as a motor and is no longer providing torque. If the brakes are not reapplied (step 150), the control unit exits the DFCO control mode and goes into a normal run control mode (step 152). If the brakes are reapplied after the accelerator is depressed (step 154), fuel delivery to the ICE continues (step 156) until the vehicle speed is zero mph (step 158), at which time fuel to the ICE is stopped in response to a communicatory signal from the control unit (step 160).

If the vehicle stops (reaches zero mph) while the MG is being used for forward creep and the ICE is not fueling (step 129), the control unit causes the MG to continue turning the ICE for a time period $T_{EI}$ (for example 0.5 seconds) (step 162). After $T_{EI}$ expires (step 164), the control unit causes the ICE throttle to close and the MG to ramp down its torque output. The control unit then causes the MG to function as a generator and stall out the ICE, that is, to reduce the crankshaft rotation to zero RPM (step 166).

If the vehicle comes to a stop during the time period when only the ICE is powering the forward creep (represented by vertical line 71 in FIG. 2) (step 168), the control unit allows the ICE to continue fueling and firing for a time period $T_{CI}$ (for example, 0.5 seconds) (step 170). After $T_{CI}$ expires (step 172), the control unit causes fuel to the ICE to be cut. The MG, acting as a generator, then brakes the ICE to a stall (step 174). The ICE is now in period 54 illustrated on FIG. 2. If the vehicle stops (reaches zero mph) just as the ICE is restarted (step 176), $T_{CI}$ is extended by an additional amount of time $T_{CIA}$ (for example, one second) (step 178). Once the new, longer, $T_{CIA}$ expires (step 172), fuel to the ICE is cut, cylinder by cylinder, and the control unit cuts spark to each cylinder after that cylinder has fired. The MG, acting as a generator, then brakes the ICE to a stall (step 174).

In any transition between deceleration with fuel cut-off and ICE restarting, if the battery pack SOC is low, the MG (only) forward creep and ICE motoring are minimized, and the ICE is restarted sooner. Under low SOC condition, torque blending is also minimized. If SOC is very low, the torque blending can be eliminated and the control unit retards the combustion chamber spark to lessen engine torque surge. If the battery pack SOC is extremely low, the ICE is continuously fueled.

In any situation in which the vehicle is stopped, and the ICE is stalled at zero RPM, the control unit exits the DFCO control mode (step 195). Before the ICE reaches zero RPM, however, at a predetermined RPM, $RPM_P$, (for example, 400 RPM), the control unit causes electric transmission pump 29 to be activated (179). The electric transmission pump increases the CVT line pressure as is illustrated by line 61 in FIG. 2 during the time period just following the time indicated by vertical line 71 or 79, depending on the deceleration rate. The line pressure is increased to at least a minimum pressure $P_{MIN}$ (for example, 70 psi), as the ICE reaches zero RPM. The electric transmission pump is turned on prior to ICE stall in order to insure a smooth acceleration without clutch shudder following the vehicle stop. At stop, the control unit monitors the CVT line pressure and uses the electric transmission pump to maintain the line pressure at least equal to $P_{MIN}$. $P_{MIN}$ is determined by the control unit based on transmission conditions at idle.

When the brake pedal is released (step 180), at a time as illustrated by vertical line 68 in FIG. 2, the control unit causes the MG to spin the ICE up to an RPM suitable for starting the ICE. The control unit causes fuel to be delivered to the ICE (the ICE is now in period 58 in FIG. 2) and causes the ICE to start. The electric transmission pump adjusts the CVT line pressure to a pressure $P_{BO}$ (for example, 100 psi) (step 182); this pressure is tapered to zero as the CVT internal mechanical pump takes over pressure handling duties. If the accelerator is depressed (step 184) (with or without brake release), and the ICE RPM is below a value $RPM_A$ (for example 200 rpm) (step 186) that results in CVT line pressure below what is necessary for a full power vehicle launch, the electric transmission pump increase CVT line pressure to a value $P_{ACC}$ (for example, 120 psi) as the MG respins the ICE (step 188). As indicated by vertical line 70 in FIG. 2, if the accelerator is depressed and if the ICE RPM is above $RPM_A$ (step 190), the ICE begins powering the vehicle in combination with the MG (functioning here as a motor) and the CVT internal mechanical pump takes over handling the CVT line pressure (step 192). As vehicle speed rises, MG torque is slowly phased out until the MG is no longer providing the crankshaft with any power (step 193).

With neither brake release nor accelerator pedal application (and the ICE stalled to zero RPM), if the vehicle movement (either forwards or backwards) is greater than a predetermined speed $V_{EO}$ (for example, one mph)(step 194), the control unit commands the MG to spin the ICE to an RPM suitable for starting (step 196). The control unit causes the ICE to receive fuel and to begin firing. If, for example, the vehicle is stopping on a very steep hill with the brake pedal only lightly depressed, the torque from the ICE is used to help keep the vehicle from rolling backwards or to ensure sufficient brake vacuum to maintain braking capacity. The DFCO procedure repeats if the vehicle speed $V_A$ is exceeded again for throttle release, or if $V_{AB}$ is exceeded again for brake apply. If neither is exceeded and the vehicle comes to rest, DFCO is not performed during the vehicle deceleration, but a "free" engine stop is performed at vehicle stop if either a lower vehicle speed $V_{free}$ (for example, 5 mph) is exceeded or if the vehicle had been crept forward (for example 1 mph) for time $T_{cr}$ (for example 5 seconds).

While various exemplary embodiments have been presented in the foregoing detailed description of the invention, it should be appreciated that a vast number of other variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for controlling the fueling of a hybrid electric motor vehicle having an internal combustion engine, a motor/generator, and a continuously variable transmission, the method comprising the steps of:
   sensing throttle position of the internal combustion engine;
   slewing the continuously variable transmission to a higher gear ratio in response to sensing a closed throttle position;
   cutting fueling of the internal combustion engine; and
   coupling the motor/generator in parallel with the internal combustion engine with the motor/generator operating as a generator.

2. The method of claim 1 further comprising the step, following the step of cutting fueling, of maintaining engine RPM of the internal combustion engine constant until the motor vehicle speed decreases to a first predetermined vehicle speed.

3. The method of claim 2 further comprising the step of slewing the continuously variable transmission to a lower gear ratio when the motor vehicle speed reaches the first predetermined vehicle speed to cause the internal combustion engine to be backdriven.

4. The method of claim 1 further comprising the steps of:
   monitoring speed of the motor vehicle; and
   terminating the step of coupling the motor/generator in parallel with the internal combustion engine with the motor/generator operating as a generator in response to the speed of the motor vehicle decreasing to a second predetermined vehicle speed.

5. The method of claim 4 further comprising the step of coupling the motor/generator in parallel with the internal combustion engine with the motor/generator operating as a motor following the step of terminating.

6. The method of claim 5 wherein the step of coupling the motor/generator in parallel with the internal combustion engine with the motor/generator operating as a motor comprises the step of operating the motor/generator as a motor to maintain the internal combustion engine RPM substantially constant.

7. The method of claim 6 wherein the hybrid electric vehicle further comprises a battery pack coupled to the motor/generator and wherein the method further comprises the steps of:
   monitoring the battery pack state of charge; and
   controlling the motor/generator operating as a motor as a function of the monitored state of charge.

8. The method of claim 7 wherein the step of controlling the motor/generator operating as a motor comprises the step of controlling the motor/generator to cause the motor vehicle speed to decrease to zero without refueling the internal combustion engine.

9. The method of claim 1 wherein the hybrid electric vehicle further comprises a battery pack coupled to the motor/generator and wherein the method further comprises the steps of:
   monitoring the battery pack state of charge; and
   controlling the motor/generator operating as a generator as a function of the monitored state of charge.

10. The method of claim 9 wherein the step of controlling comprises the step of controlling the step of slewing the continuously variable transmission.

11. The method of claim 9 wherein the hybrid electric vehicle further comprises an air conditioning compressor and wherein the step of controlling further comprises the step of controlling the motor/generator operating as a generator as a function of air conditioner compressor load.

* * * * *